US010669992B2

(12) United States Patent
Lee

(10) Patent No.: US 10,669,992 B2
(45) Date of Patent: Jun. 2, 2020

(54) WIND POWER COLLECTION AND ELECTRICITY GENERATION SYSTEM

(71) Applicant: Sang whan Lee, Seoul (KR)

(72) Inventor: Sang whan Lee, Seoul (KR)

( * ) Notice: Subject to any disclaimer, the term of this patent is extended or adjusted under 35 U.S.C. 154(b) by 954 days.

(21) Appl. No.: 15/035,752

(22) PCT Filed: Nov. 10, 2014

(86) PCT No.: PCT/KR2014/010758
§ 371 (c)(1),
(2) Date: May 11, 2016

(87) PCT Pub. No.: WO2015/069079
PCT Pub. Date: May 14, 2015

(65) Prior Publication Data
US 2016/0281683 A1    Sep. 29, 2016

(30) Foreign Application Priority Data

Nov. 11, 2013  (KR) ......................... 10-2013-0136495

(51) Int. Cl.
*F03D 9/46* (2016.01)
*F03D 9/25* (2016.01)
(Continued)

(52) U.S. Cl.
CPC ................. *F03D 9/25* (2016.05); *F03D 9/46* (2016.05); *F03D 13/20* (2016.05); *F03D 15/00* (2016.05);
(Continued)

(58) Field of Classification Search
CPC ... F03D 9/46; F03D 9/25; F03D 13/20; F03D 3/02
See application file for complete search history.

(56) References Cited

U.S. PATENT DOCUMENTS 5,272,378 A * 12/1993 Wither .................... F03D 3/065
                                                                290/1 R
6,809,432 B1 * 10/2004 Bilgen .................... F03D 13/20
                                                                290/55
(Continued)

FOREIGN PATENT DOCUMENTS

KR     10-2004-0056130 A     6/2004
KR     10-2010-0032604 A     3/2010
(Continued)

OTHER PUBLICATIONS

International Search Report in International Application No. PCT/KR2014/010758, dated Jan. 9, 2015.

*Primary Examiner* — Woody A Lee, Jr.
*Assistant Examiner* — Michael L Sehn
(74) *Attorney, Agent, or Firm* — Park, Kim & Suh, LLC

(57) ABSTRACT

The present invention relates to a wind power collection and electricity generation system that includes: wind power generation units including a plurality of central wind power units vertically installed along a center line of a roadway, on which vehicles run in two opposite lanes, and a plurality of first ceiling wind power units extending horizontally to at least a first side from upper ends of the central wind power units; and a speed increaser connected to a rotary shaft of any one of the wind power generation units to increase a rotational speed of the wind power generation unit, in which the central wind power units and the first ceiling wind power units are connected by a predetermined connection unit and generate electricity using torque of blades that are rotated perpendicular to a flow direction of wind generated by vehicles.

12 Claims, 7 Drawing Sheets

(51) Int. Cl.
  *F03D 15/10* (2016.01)
  *F03D 13/20* (2016.01)
  *F03D 15/00* (2016.01)

(52) U.S. Cl.
  CPC ...... *F03D 15/10* (2016.05); *F05B 2240/9113* (2013.01); *Y02B 10/30* (2013.01); *Y02E 10/728* (2013.01); *Y02E 10/74* (2013.01)

(56) References Cited

U.S. PATENT DOCUMENTS

| | | | |
|---|---|---|---|
| 7,098,553 B2* | 8/2006 | Wiegel | F03D 3/002 290/55 |
| 7,525,210 B2* | 4/2009 | Fein | B60K 16/00 290/44 |
| 2011/0291422 A1* | 12/2011 | Watanabe | F16C 19/18 290/55 |

FOREIGN PATENT DOCUMENTS

| | | |
|---|---|---|
| KR | 10-2011-0065922 A | 6/2011 |
| KR | 10-1069985 B1 | 10/2011 |
| KR | 10-2012-0063888 A | 6/2012 |
| KR | 10-1211581 B1 | 12/2012 |
| KR | 10-2013-0081565 A | 7/2013 |
| KR | 10-1285545 B1 | 7/2013 |

* cited by examiner

WIND POWER COLLECTION AND ELECTRICITY GENERATION SYSTEM

CROSS-REFERENCE TO RELATED APPLICATIONS

This application is the National Stage filing under 35 U.S.C. 371 of International Application No. PCT/KR2014/010758, filed on Nov. 10, 2014, which claims the benefit of Korean Patent Application No. 10-2013-0136495, filed on Nov. 11, 2013, the contents of which are all hereby incorporated by reference herein in their entirety.

TECHNICAL FIELD

The present invention relates to a wind power collection and electricity generation system and, more particularly, to a wind power collecting, electricity generating system that can generate power using wind power generated by vehicles passing by each other in opposite directions and can maintain balance in the power generation using a speed increaser that is operated by power transmitted through connecting shafts connected to rotary shafts of a plurality of wind power units.

BACKGROUND ART

In general, as types for generating power, there are nuclear power generation using atomic power, thermal power generation using thermal power, hydroelectric power generation using hydraulic power, and wind power generation using wind power, in which the nuclear power generation using atomic power and the thermal power generation using thermal power are excellent in terms of efficiency, but have a problem of environmental contamination and exhaustion of resources. Further, as for hydroelectric power generation and wind power generation, there is no problem of environmental contamination and exhaustion of resources, but large-scale facilities are required to generate a great amount of power and such facilities have to be constructed in specific areas.

In particular, a wind power generation system is difficult to construct because it requires windy areas such as a seaside or a mountain locale. Accordingly, with a rising demand for energy saving, recently, studies for developing a small-sized wind power generation system for generating power even from a small amount of wind using a small-sized rather than large-sized wind power generator have been conducted.

Some examples of a small-sized wind power generation system have been disclosed in Korean Patent Application Publication NO. 10-2010-0032604, Korean Patent No. 10-1211581, Korean Patent Application Publication NO. 10-2012-0063888, and Korean Patent Application Publication NO. 10-2013-0081565.

These systems are commonly constructed at roadways for vehicles such as a car or a subway train and use wind power generated by the vehicles.

However, these systems have a problem in that separate power generation modules should be individually installed, power generation is not uniform due to differences in intensity of wind power at places where the power generation modules are installed, and power generation is reduced because wind power generated by vehicles on the roadways is exhausted as it goes up.

DISCLOSURE

Technical Problem

The present invention has been made in an effort for solving the problems and an object of the present invention is to provide a wind power collection and electricity generation system that can minimize a loss of wind power generated by vehicles on a roadway and increase wind power generation efficiency by generating uniform power.

Another object of the present invention is to provide a wind power collection and electricity generation system that can maximize efficiency by increasing a rotational speed of a wind power unit using a speed increaser in addition to wind power generated by vehicles.

Another object of the present invention is to provide a wind power collection and electricity generation system that can be used extensively for railroads around and under the ground and roadways.

Technical Solution

A wind power collection and electricity generation system according to an embodiment of the present invention includes: wind power generation units including a plurality of central wind power units vertically installed along a center line of a roadway, on which vehicles run in two opposite lanes, and a plurality of first ceiling wind power units extending horizontally to at least a first side from upper ends of the central wind power units; and a speed increaser connected to a rotary shaft of any one of the wind power generation units to increase a rotational speed of the wind power generation unit, in which the central wind power units and the first ceiling wind power units are connected by a predetermined connection unit and generate electricity using torque of blades that are rotated perpendicular to a flow direction of wind generated by vehicles.

The wind power generation units may further include first vertical wind power units vertically installed along one of the lanes of the roadway to be connected to ends of the first ceiling wind power units by the connection unit, and rotated with the central wind power units and the first ceiling wind power units.

The wind power generation units may further include a plurality of second ceiling wind power units extending horizontally to a second side from the upper ends of the central wind power units.

The wind power generation units may further include second vertical wind power units vertically installed along the other lane of the roadway to be connected to ends of the second ceiling wind power units by the connection unit, and rotated with the second ceiling wind power units.

The connection unit may be an assembly of bevel gears.

The system may further include a connection shaft connected, through a predetermined connection unit, to the rotary shaft of at least any one of the central wind power units, the first ceiling wind power units, the second ceiling wind power units, the first vertical wind power units, and the second vertical wind power units, and increasing the rotational speed of the wind power generation units by being rotated by the speed increaser.

The connection unit may be a worm-worm wheel gear assembly composed of a worm wheel gear on the rotary shaft of the wind power generation unit and a worm gear formed on the shaft and engaged with the worm wheel gear.

The speed increaser may have a variable capacity.

The system may further include an assembly of support members for installing the wind power generation units.

The assembly of support members may include: a pair of first support members elongated in a running direction of vehicles to fix housings for accommodating the connection units over sides of the roadway; a plurality of second support members connecting the first support members to each other; and a plurality of third support members fixing the first support members to the ground.

The wind power generation units may have a plurality of blades extending radially from the rotary shaft, and the blades of the central wind power units may have a straight horizontal cross-section.

The wind power generation units may have a plurality of blades extending radially from the rotary shaft, and the blades of the central wind power units may have a vertical cross-section rounded opposite to running directions of vehicles.

The blades of the other wind power units except the central wind power units may have a vertical cross-section rounded opposite to running directions of vehicles.

A wind power collection and electricity generation system according to another embodiment of the present invention includes: an assembly of support members installed throughout the other sides except for running directions of vehicles to obtain power by transmitting wind power generated by vehicles to blades; a plurality of wind power generation units each having the blades and mounted on the assembly of support members; assemblies of bevel gears connecting adjacent wind power generation units of the wind power generation units to rotate the wind power generation unit with the same wind power; and a speed increaser increasing rotational speeds of the wind power generation units by transmitting predetermined torque to one or more connection shafts connected to the wind power generation units, which are rotated together by the assemblies of bevel gears, through a predetermined connection unit.

Advantageous Effects

A wind power collection and electricity generation system according to the present invention has the following various effects.

First, it is possible to collect and use without loss most of wind power generated by vehicles, so it is possible to increase efficiency of the entire wind power collection and electricity generation system.

Second, it is possible to continuously generate power using a speed increaser, regardless of intensity of wind.

Third, it is possible to apply the wind power collection and electricity generation system to any place as long as it is a roadway on which vehicles run in opposite directions, so the system can be used for more various types of roads.

MODE FOR INVENTION

Hereinafter, wind power collection and electricity generation systems according to embodiments of the present invention are described in detail with reference to the accompanying drawings.

Figure 1:
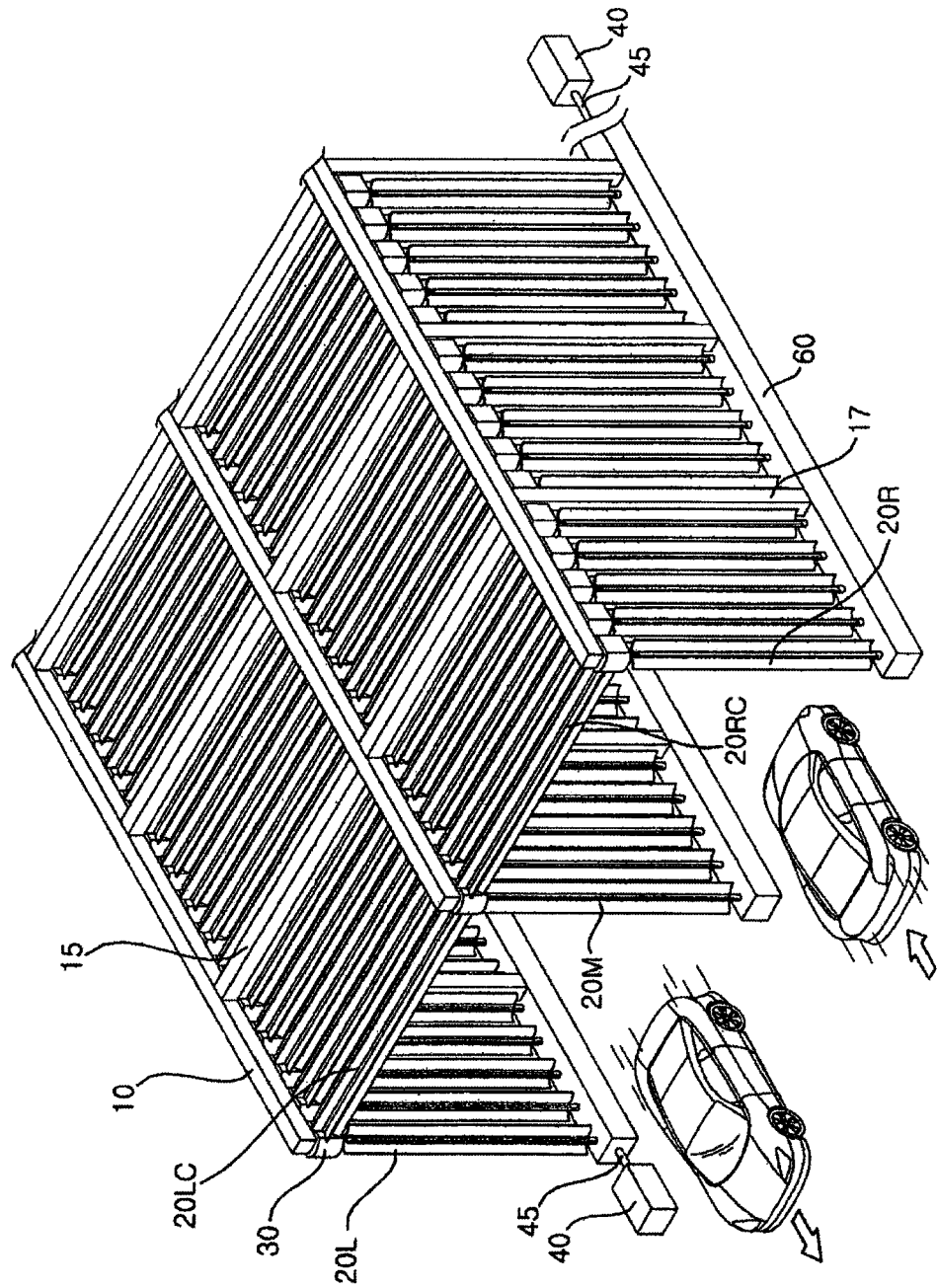
FIG. 1 is a perspective view showing a wind power collection and electricity generation system according to a first embodiment of the present invention.
Figure 2:
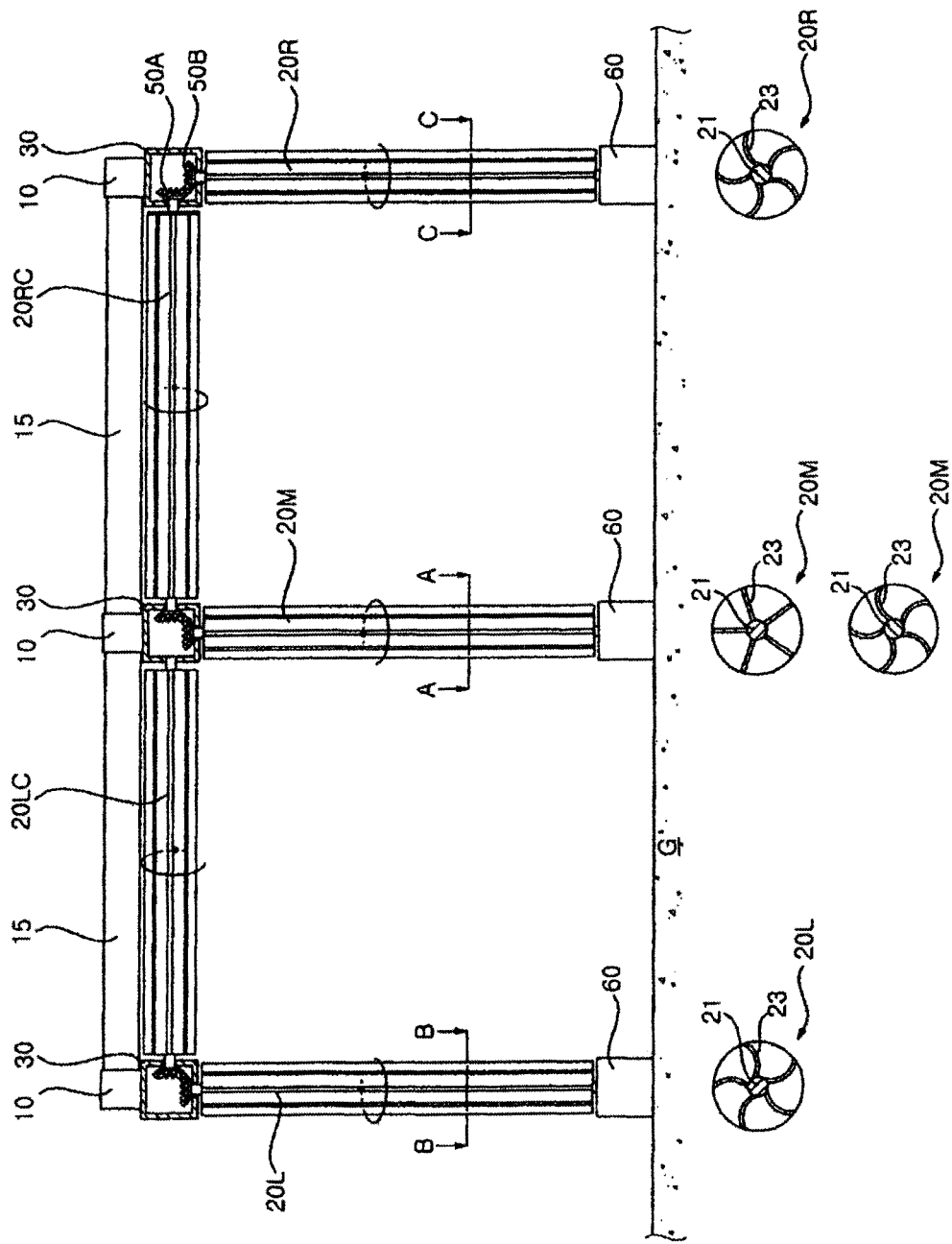
FIG. 2 is a front view of FIG. 1.
Figure 3:
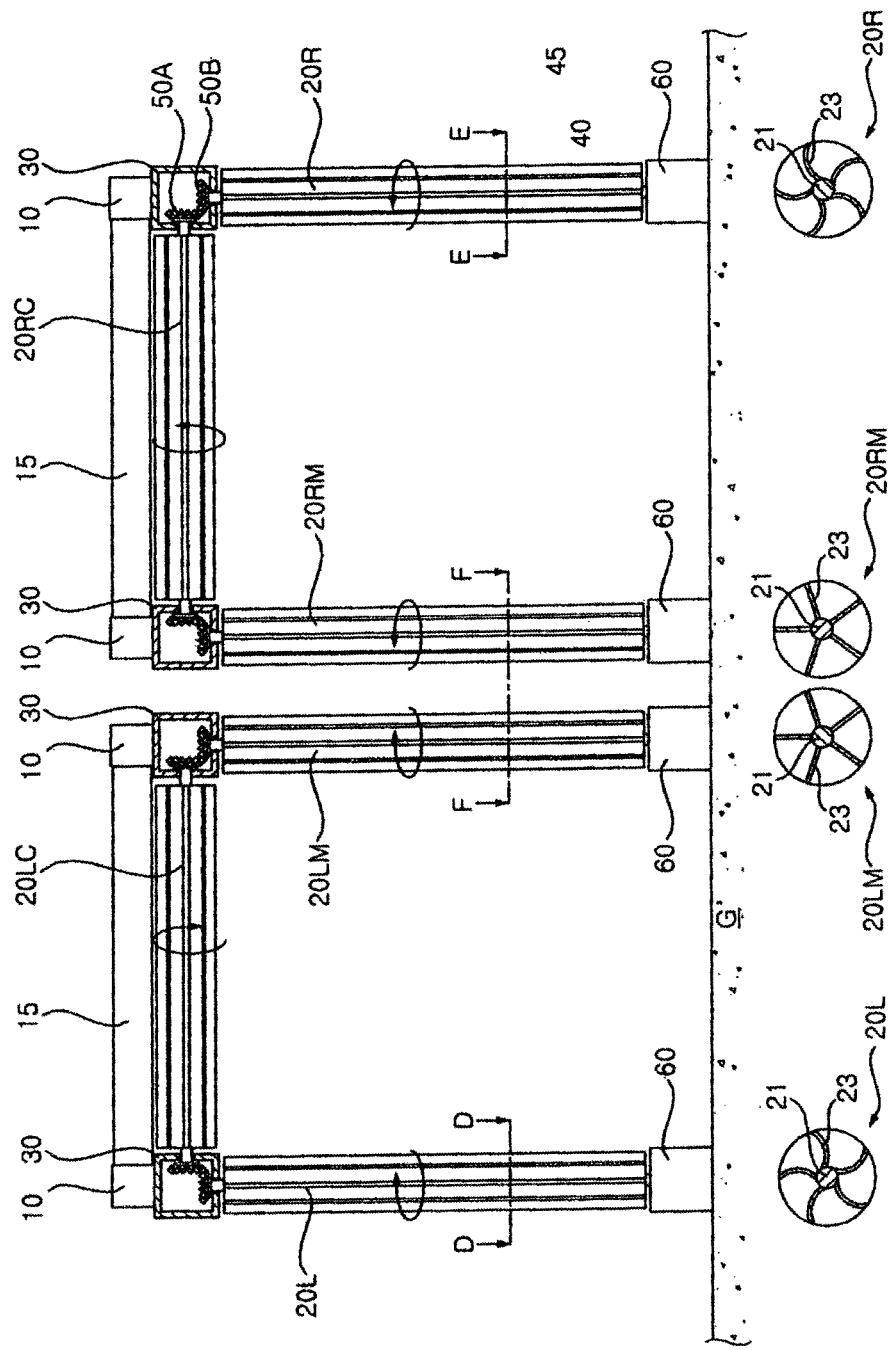
FIGS. 3 to 5 are front views of wind power collection and electricity generation systems according to other embodiments of the present invention.
Figure 4:
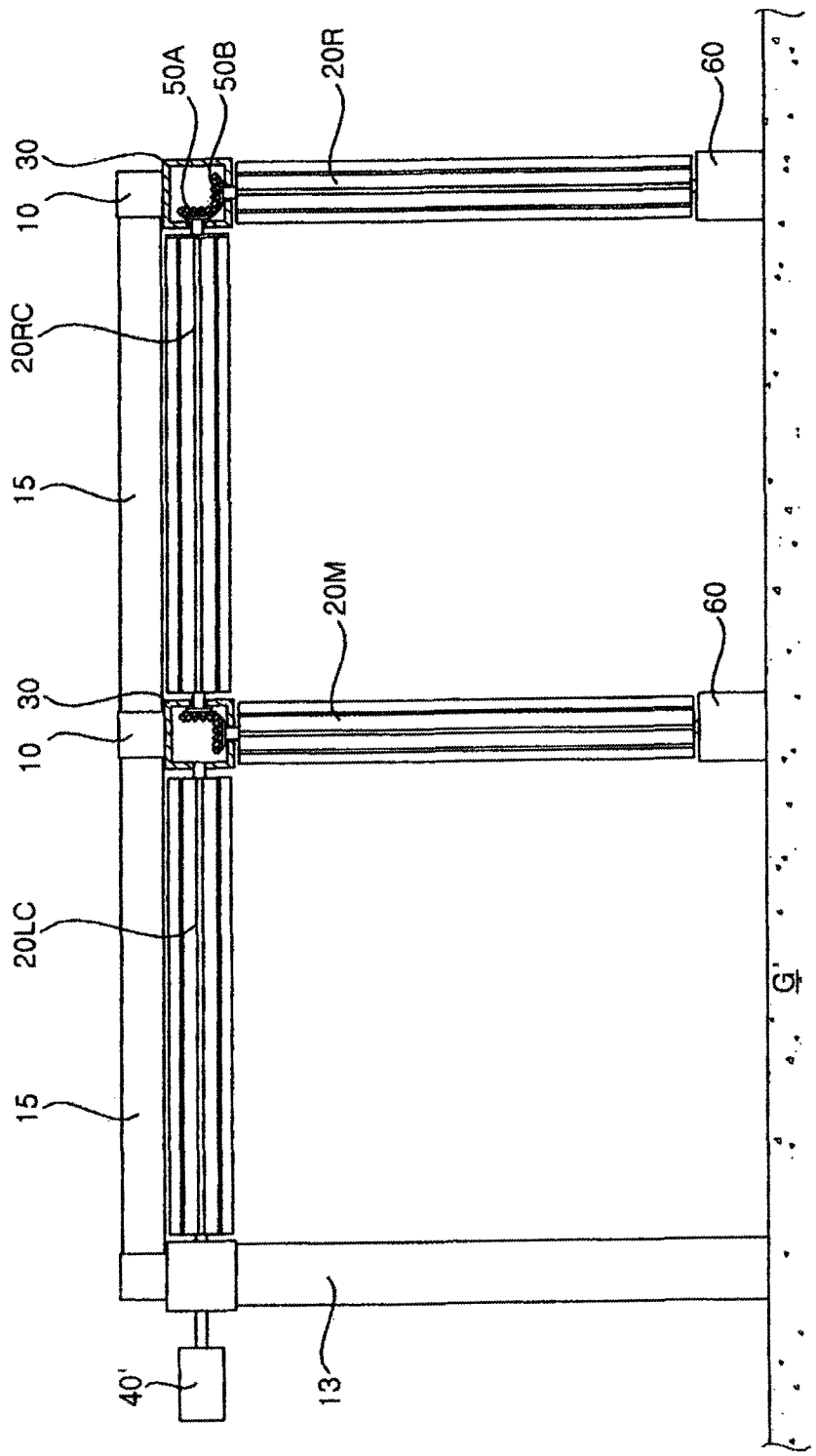
Figure 5:
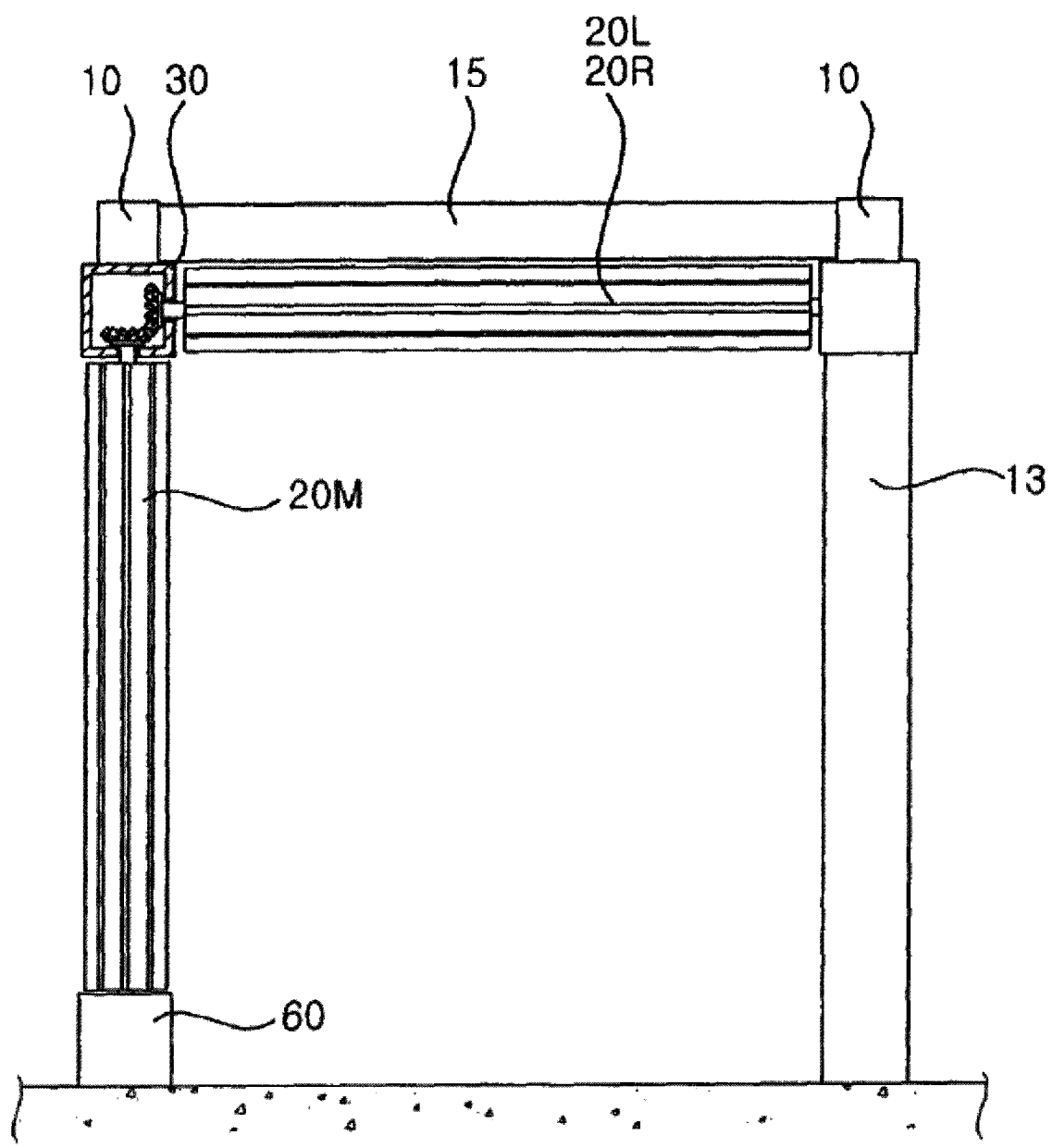
Figure 6:
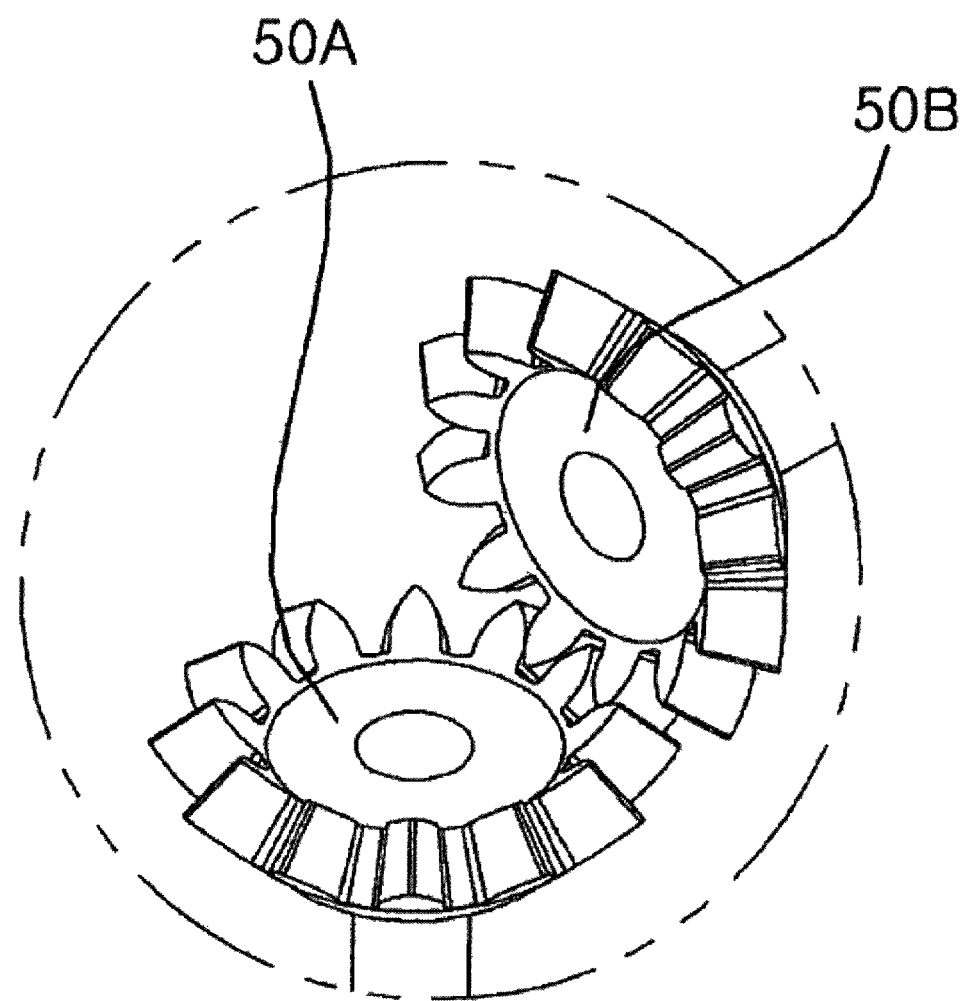
FIG. 6 is a perspective view showing a connection unit of a wind power collection and electricity generation unit of the present invention.
Figure 7:
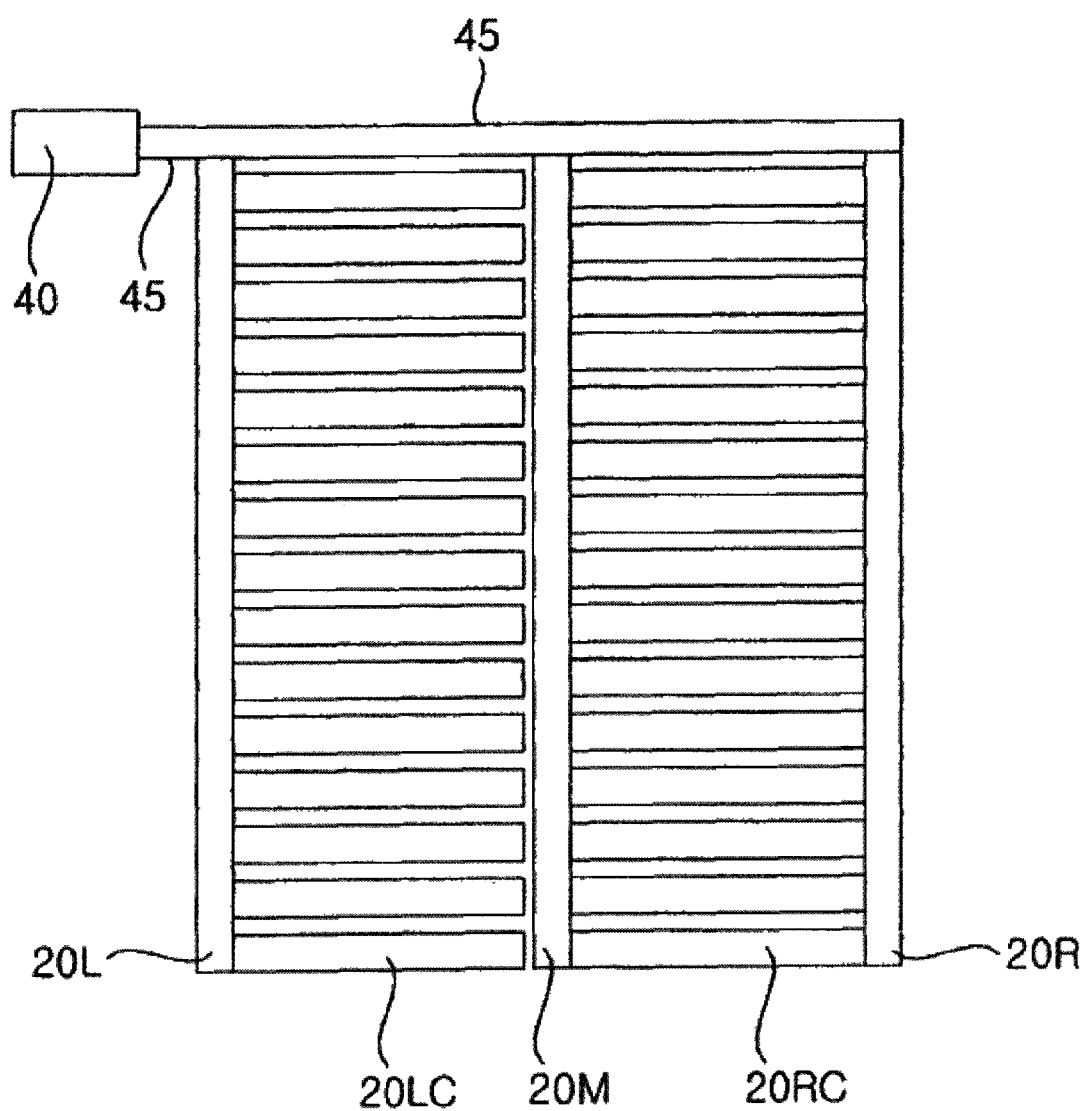
FIG. 7 is a conceptual view showing operation of a speed increaser of a wind power collection and electricity generation unit of the present invention.

FIG. 1 is a perspective view showing a wind power collection and electricity generation system according to a first embodiment of the present invention. FIG. 2 is a front view of FIG. 1. FIGS. 3 to 5 are front views of wind power collection and electricity generation systems according to other embodiments of the present invention. FIG. 6 is a perspective view showing a connection unit of a wind power collection and electricity generation unit of the present invention. FIG. 7 is a conceptual view showing operation of a speed increaser of a wind power collection and electricity generation unit of the present invention.

A wind power collection and electricity generation system according to the first embodiment of the present invention is characterized by being installed over a roadway where vehicles run in opposite directions. The roadway includes a roadway on the ground and a roadway under the ground and may include railways for trains (or subway trains). The concept of the term 'vehicle' is applied in common not only to the embodiment of a wind power collection and electricity generation system of the present invention, but to all of other embodiments to be described below and the system is not installed directly over a roadway or a railroad, but is preferably installed in a way that does not interfere with traffic of cars and trains.

It should be noted that the term 'vehicle' means a vehicle that runs on a roadway where the wind power collection and electricity generation system of the present invention can be installed, and is not limited to a train (or a subway train) and a car. That is, a wind power collection and electricity generation system of the present invention can be applied without limits to places where it does not use natural wind, but can use artificial wind power generated in predetermined processes. For example, since it is possible to use wind power generated by an aircraft that is taking off on the ground, a wind power collection and electricity generation system can be installed at a place around a takeoff field.

A wind power collection and electricity generation system according to the first embodiment of the present invention, as shown in FIG. 5, may include a plurality of central wind power units 20M vertically installed and arranged along the center line of a roadway where vehicles run in opposite directions and a plurality of first ceiling wind power units 20RC extending horizontally to a first side from the upper ends of the central wind power units 20M.

The central wind power units 20M and the first ceiling wind power units 20RC (hereafter, all of the central wind power units 20M and ceiling wind power units 20RC and 20LC are commonly referred to as 'wind power generation units 20') are arranged in the flow direction of wind and generate power by rotating about predetermined rotary shafts 21 by wind having predetermined intensity that is generated by vehicles running on the roadway. Coils and magnet assemblies, which are not shown, can be arranged around the rotary shafts 21 to generate an electric field.

The wind power generation units 20 may each include the rotary shaft 21 and a plurality of blades 23 extending radially outward from the rotary shaft 21. The blades 23 may be designed to obtain torque with maximum efficiency from friction with wind generated by vehicles.

A wind power collection and electricity generation system according to the first embodiment will be described under the assumption that the first ceiling wind power units 20RC are arranged over the right lane of a roadway in the drawings. The central wind power units 20M and the first ceiling wind power units 20RC are each connected by a predetermined connection unit 50A and 50B to be simultaneously rotated.

A wind power collection and electricity generation system of the present invention is not limited to the first embodiment and may be implemented in a second embodiment, for example, it may further include first vertical wind power units 20R vertically connected to ends of the first ceiling wind power units 20RC by connection units 50A and 50b and arranged along a side of one of two lanes of a roadway.

That is, in the first embodiment described above, central wind power units 20M and the first ceiling wind power units 20RC are arranged in an L-shape with the bottom and a side open to the roadway, but, in the second embodiment, the first vertical wind power units 20R are further provided, in addition to the central wind power units 20M and the first ceiling wind power units 20RC in the first embodiment, so they are substantially arranged in a U-shape with the bottom open.

In the second embodiment of the present invention, similar to the first embodiment describe above, the central wind power units 20M, the first ceiling wind power units 20RC, and the first vertical wind power units 20R are connected by connection units to be simultaneously rotated.

A wind power collection and electricity generation system of the present invention is not limited to the first and second embodiments, and as shown in FIG. 4, it may be achieved in a third embodiment, which further includes a plurality of second ceiling wind power units 20LC extending horizontally to a second side (that is, to the left in the figures) from the upper ends of the central wind power units 20M.

As the wind power collection and electricity generation system according to the third embodiment of the present invention further includes the second ceiling wind power units 20LC, as shown in FIG. 4, the system substantially has an F-shape with the top turned right.

Further, according to a fourth embodiment of the present invention, as shown in FIGS. 1 and 2, the wind power collection and electricity generation system according to the third embodiment shown in FIG. 4 may further include second vertical wind power units 20L vertically connected to ends of the second ceiling wind power units 20LC by connection units 50A and 50B to rotate with the second ceiling wind power units 20LC and arranged along a side of the other lane of the roadway. In the fourth embodiment, the central wind power units 20M, the first ceiling wind power units 20RC, and the first vertical wind power units 20R make a tunnel for cars running in the right lane of the roadway, while the central wind power units 20M, the second ceiling wind power units 20LC, and the second vertical wind power units 20L make a tunnel for cars running in left lane of the roadway, so the wind power units are arranged substantially in an M-shape.

However, in the fourth embodiment, vehicles running in the left and right lanes of the roadway generate wind in opposite directions, so the first ceiling wind power units 20RC and the second ceiling wind power units 20LC are rotated in opposite directions; therefore, a set of ceiling wind power units connected to the central wind power units 20M by the connection units 50A and 50B should be any one of the sets of first ceiling wind power units 20RC and the second ceiling wind power units 20LC.

In the following description, a set of components that can generate power using wind generated by vehicles is defined, for the convenience of description, as a concept of "unit power generation module". For example, according to the fourth embodiment of the present invention, a central wind power unit 20M, a first ceiling wind power unit 20RC, and a first vertical wind power unit 20R can be determined as one unit power generation module that is an assembly capable of generating power using predetermined wind power, while a second ceiling wind power unit 20LC and a second vertical wind power unit 20L, which are not connected to the central wind power unit 20M can be defined as one unit power generation module that is an assembly capable of generating power using predetermined wind power.

The connection unit 50A and 50B may be an assembly of bevel gears 50A and 50B (hereafter, the connection unit and the assembly of bevel gears are both indicated by the same reference numeral). That is, as shown in FIG. 6, the connection unit 50A and 50B may include a first bevel gear 50A at an end of the rotary shaft 21 of any one of the wind power units and a second bevel gear 50B at an end of the rotary shaft 21 of the other one of the wind power units.

The assembly of bevel gears 50A and 50B changes a rotational direction at 90 degrees. That is, by connecting the central wind power unit 20M and the first ceiling wind power unit 20RC, connecting the first ceiling wind power unit 20RC and the first vertical wind power unit 20R, or connecting the second ceiling wind power unit 20LC and the second vertical wind power unit 20L using the connection unit 50A and 50B, it is possible to use wind power generated by vehicles without a loss, as compared with rotating only one wind power unit.

The assembly of bevel gears 50A and 50B is disposed in a housing 30. The rotary shafts 21 of the wind power generation units 20 to be connected are inserted in the housing 30 and are coupled in the housing 30 by the assembly of bevel gears 50A and 50B.

Since vehicles running in opposite lanes generate wind in opposite directions, the blades 23 of the wind power generation units 20 may be formed in different shapes.

For example, the central wind power units 20M, in Korea where vehicles run in the right lane, are rotated in the same direction by wind generated by vehicles in the lanes, as shown in FIGS. 1 and 2, so the blades 23 may have a straight vertical cross-section, extending radially from the rotary shaft 21. Further, the blades 23 of the central wind power units 20M may have a vertical cross-section rounded opposite to the running directions of vehicles, extending radially from the rotary shaft 21.

Further, the blades 23 of the other wind power generation units 20, except the central wind power unit 20M, may have a vertical or horizontal cross-section rounded opposite to the running directions of vehicles, extending radially from the rotary shaft 21.

The wind power collection and electricity generation system according to the present invention has the advantage that it can be installed at one place by forming a tunnel for vehicles over a lane or blocking at least two sides from the outside except the running directions of vehicles.

The wind power collection and electricity generation system according to the present invention may further include an assembly of support members 10, 15, and 17 to support the wind power generation units 20 for stable installation at one place.

The assembly of support members 10, 15, and 17 may be installed in advance over the roadway to install the wind power generation units 20.

The assembly of support members 10, 15, and 17 may include a pair of first support members 10 arranged along the sides of the lanes to fix the housings 30 accommodating the connection units 50A and 50B over the roadway, a plurality of second support members 15 connecting the first support members 10 to each other, and a plurality of third support members 17 fixing the first support members 10 to the ground G.

The assembly of support members 10, 15, and 17 is provided to firmly install the wind power generation units 20, and the wind power generation units 20 can be individually installed after constructing a framework using the first support members 10, the second support members 15, and the third support members 17.

The parts of the assembly of support members 10, 15, and 17 fixed to the ground G may be firmly fixed to the ground by concrete. However, the present invention is not limited thereto, and though not shown in the figures, the entire assembly of support members 10, 15, and 17 may be installed to be movable along a roadway such as a railroad.

The wind power collection and electricity generation system of the present invention may further include a speed increaser 40 that is connected to the rotary shaft 21 of any one of the power generation units and increases the rotational speed of the wind power generation unit 20.

The speed increaser 40 increases the rotational speed of the wind power generation unit 20 by applying a little torque even if vehicles generate small wind power.

The speed increaser 40 may be variable in capacity. For example, the wind power collection and electricity generation system of the present invention is included in the range of a small-sized power generation system, but if more unit power generation modules composed of the wind power generation units are provided, it may extend into a large-sized power generation system. Further, when the system is disposed along a roadway, accelerating a plurality of wind power units using one speed increaser 40 necessarily depends on the capacity of the speed increaser 40 and roadways provide different installation environments, so various capacities may be required for the speed increaser 40. Accordingly, it is advantageous that the speed increaser 40 has variable capacity to actively deal with this problem.

The wind power collection and electricity generation system of the present invention may further include a connection shaft 45 that is connected, through a predetermined connection unit (not shown), to the rotary shaft 21 of at least any one of the central wind power units 20M, the first ceiling wind power units 20RC, the second ceiling wind power units 20LC, the first vertical wind power units 20R, and the second vertical wind power units 20L, and increases the rotational speed of the wind power generation units 20 by being rotated by the speed increaser 40.

The predetermined connection unit may be a gear assembly on the rotary shafts 21 of the wind power generation units 20.

The connection shaft 45 is connected to the rotary shafts 21 of the wind power generation units 20 arranged along a roadway and transmits torque from the speed increaser 40. Even if torque from the speed increaser 40 is transmitted to only any one of the wind power generation units 20 composing a unit power generation module by the connection shaft 45, the torque is transmitted to all of the wind power generation units 20 by the assemblies of bevel gears 50A and 50B, which is advantageous in terms of efficiency.

The connection unit connecting the connection shaft 45 to the rotary shafts 21 of the wind power generation units 20 may be a gear assembly, that is, a worm-worm wheel gear assembly composed of a worm gear formed on the connection shaft 45 and a worm wheel gear formed on the rotary shaft of the wind power unit, or may be a bevel gear assembly composed of first bevel gear formed on the connection shaft 45 and a second bevel gear formed on the rotary shaft of the wind power unit. The gear assemblies may be configured to maximally transmit the power from the speed increaser 40 by rotation of the connection shaft 45.

For example, according to the first embodiment of the present invention, when the numbers of unit power generation modules using wind power generated by vehicles are different and differences in wind power are generated accordingly, the speed increaser 40 is connected to the power generation units at a side from the central wind power units 20M and can perform an assistant function for assisting balanced power generation in the entire system.

In other words, as shown in FIG. 3, a pair of central wind power units 20RM and 20LM for two lanes of a roadway, respectively, may be provided, and a first ceiling wind power unit 20RC and a second ceiling wind power unit 20LC, and a first vertical wind power unit 20R and a second vertical wind power unit 20L may be connected to the central wind power units 20RM and 20LM, respectively, substantially in a U-shape to compose power generation units. In this case, there is substantially no factor that changes wind power, which is generated by vehicles running in the lanes, except the number of vehicles, so uniform power generation can be achieved by installing a speed increaser 40 for each of the unit power generation modules for the lanes and adjusting the operational capacities of the speed increasers 40.

However, as shown in FIGS. 1 and 2, when one central wind power unit 20M is provided, the part that is connected to the central wind power unit 20M by the connection units 50A and 50B and the part that is not directly connected to the central wind power unit 20M necessarily receive different wind power even if the same number of vehicles passes through them, so uniform power generation is difficult to realize due to the difference in wind power. Therefore, by connecting the speed increaser 40 to the parts using the connection shafts 45 and adjusting the operational capacities in accordance with a difference in wind power, uniform power generation can be achieved.

On the other hand, it is advantageous in terms of management efficiency to provide one speed increaser 40 having variable capacity, rather than providing a plurality of speed increasers 40.

In detail, as shown in FIG. 7, the speed increaser 40 is disposed at a side of a roadway where it can be managed and is selectively connected to the connection shafts 45 to the unit power generation modules (two connection shafts for two unit power generation modules), whereby it is possible to achieve uniform power generation by a wind power collection and electricity generation system of the present invention by adjusting the operational capacity in accordance with wind power.

A wind power collection and electricity generation system of the present invention should be installed without interfering with vehicles running on a roadway.

Accordingly, since the first ceiling wind power unit 20RC and the second ceiling wind power unit 20LC of the wind power generation units 20 are installed over a railroad, their heights should be designed sufficiently in consideration of the maximum height of vehicles that run on the roadway.

Further, since the first vertical wind power unit 20R and the second vertical wind power unit 20L of the wind power generation units 20 are vertically installed at sides of a roadway, they should be designed to be installed at outer areas that do not intrude into emergency roads at sides of the roadway. Further, when gust stoppers for blocking a gust of wind are constructed along a roadway, the vertical wind power units can be installed at the gust stoppers.

On the other hand, though not shown in the figures, a structure for preventing intrusion and collision of vehicles may be provided between a roadway and the first vertical wind power unit 20R and the second vertical wind power unit 20L.

It is advantageous for the connection shaft 45 not to be exposed to the outside, so when the connection shaft 45 is designed to connect the lower ends of the rotary shafts 21 of the first vertical wind power units 20R and the second vertical wind power units 20L installed along a roadway and is installed on the ground G, an installation housing 60 for accommodating the connection shaft 45 may be provided, as shown in FIGS. 1 to 5. Further, when the connection shaft 45 is installed on the ground G, a housing (not shown) where it can be inserted through a concrete pipe etc. may be provided.

Although embodiments of a wind power collection and electricity generation system of the present invention were described for a roadway on which vehicles run in opposite directions, the present invention should not be construed as being limited to a roadway having two opposite lanes.

In detail, a wind power collection and electricity generation system of the present invention is characterized by collecting wind power generated by vehicles and transmitting the wind power directly to blades regardless of the type of roadway, such as, a roadway with two opposite lanes.

For collecting wind power in this way, the wind power generation units 20 are mounted on the assembly of support members 10, 15, and 17, which is installed over a roadway, in a structure for maximally using wind power without a loss (that is, a structure for blocking all other sides except for the running directions of vehicles), and then are connected by assemblies of bevel gears 50A and 50b to be simultaneously rotated in order to remove differences in collected wind power due to the amount of vehicles running on the roadway and external causes. Thereafter, the speed increaser 40 is connected through one or more connection shafts 45 so that the rotational speeds of the wind power generation units are increased and uniform power generation is achieved.

Therefore, a wind power collection and electricity generation system of the present invention is not limited to the embodiments described above, and a concept for achieving uniform power generation by removing differences among the wind power generation units 20, in addition to the configuration and combination of the wind power generation units 20 that can actively collect and maximally use wind power generated by vehicles, should be admitted first.

According to wind power collection and electricity generation system of the present invention, it is possible to maximally reduce a loss of wind power generated by vehicles by arranging the wind power generation units 20 to block at least two sides of a roadway except the running directions of vehicles. Further, the wind power collection and electricity generation system can be actively applied to underground roadways that are being recently constructed, roadways that have been constructed on the ground, or a takeoff field at an airport, so the system can be more commonly used.

Further, since the speed increaser 40 is provided to increase the rotational speed not only one, but a plurality of the wind power generation units 20, it is possible to achieve uniform power generation and it is also possible to remove the problems of environmental contamination and resource exhaustion of atomic power generation and thermal power generation of which the scale is increased.

Various embodiments of a wind power collection and electricity generation system of the present invention were described in detail above with reference to the accompanying drawings. However, the present invention is not limited to the embodiments and may be changed and modified in various ways by those skilled in the art without departing from the scope of the present invention. Therefore, the real scope of the present invention should be determined by claims described below.

<Description of the Reference Numerals in the Drawings>

10: First support member
15: Second support member
17: Third support member
20: Wind power generation unit
20M: Central wind power unit
20RC: First ceiling wind power unit
20LC: Second ceiling wind power unit
20R: First vertical wind power unit
20L: Second vertical wind power unit
30: Housing
40: Speed increaser
45: Connection shaft
50A, 50B: Connection unit (Assembly of bevel gears)
60: Installation housing

The invention claimed is:

1. A wind power collection and electricity generation system comprising:
   a plurality of central wind power units vertically installed along a center line of a roadway, on which vehicles run in left and right lanes;
   a plurality of first ceiling wind power units extending horizontally above the right lane from upper ends of the central wind power units;
   a first power transmission unit provided between the central wind power units and the first ceiling wind power units such that the central wind power units rotate together with the first ceiling wind power units;
   a plurality of first vertical wind power units vertically installed along the right lane of the roadway to be connected to right ends of the first ceiling wind power units;
   a second power transmission unit provided between the first ceiling wind power units and the first vertical wind power units such that the first ceiling wind power units rotate together with the first vertical wind power units; and
   a speed increaser connected to a rotary shaft of any one of the central wind power units, the first ceiling wind power units, and the first vertical wind power units in order to increase a rotational speed of the wind power units,
   wherein the central wind power units, the first ceiling wind power units, and the first vertical wind power units generate electricity using torque of blades that are rotated by wind generated by the vehicles.

2. The system of claim 1, further comprising a plurality of second ceiling wind power units extending horizontally above the left lane from the upper ends of the central wind power units.

3. The system of claim 2, further comprising:
- a plurality of second vertical wind power units vertically installed along the left lane of the roadway to be connected to left ends of the second ceiling wind power units; and
- a third power transmission unit provided between the second ceiling wind power units and the second vertical wind power units such that the second ceiling wind power units rotate together with the second vertical wind power units.

4. The system of claim 3, wherein the wind power units have a plurality of blades extending radially from the rotary shaft, and
- the blades of the central wind power units have a straight horizontal cross-section.

5. The system of claim 4, wherein the blades of wind power units other than the central wind power units have a vertical cross-section rounded opposite to running directions of vehicles.

6. The system of claim 3, wherein the wind power units have a plurality of blades extending radially from the rotary shaft, and
- the blades of the central wind power units have a vertical cross-section rounded opposite to running directions of vehicles.

7. The system of claim 1, wherein each of the first and second power transmission units is an assembly of bevel gears.

8. The system of claim 1, further comprising a connection shaft connected between the speed increaser and the rotary shaft.

9. The system of claim 8, further comprising a third power transmission unit provided between the connection shaft and the rotary shaft, wherein the third power transmission unit is a worm-worm wheel gear assembly composed of a worm wheel gear on the rotary shaft and a worm gear formed on the connection shaft and engaged with the worm wheel gear.

10. The system of claim 1, wherein the speed increaser has a variable capacity.

11. The system of claim 1, further comprising an assembly of support members for installing the wind power units.

12. The system of claim 11, wherein the assembly of support members includes:
- a pair of first support members elongated in a running direction of vehicles to fix housings for accommodating the first and second power transmission units over sides of the roadway;
- a plurality of second support members connecting the first support members to each other; and
- a plurality of third support members fixing the first support members to the ground.

* * * * *